United States Patent
Scaglione

(10) Patent No.: US 8,339,951 B2
(45) Date of Patent: Dec. 25, 2012

(54) METHOD FOR CONFIGURATION OF A LOAD BALANCING ALGORITHM IN A NETWORK DEVICE

(75) Inventor: Giuseppe Scaglione, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 355 days.

(21) Appl. No.: 12/845,446

(22) Filed: Jul. 28, 2010

(65) Prior Publication Data

US 2012/0026878 A1 Feb. 2, 2012

(51) Int. Cl.
*H04L 12/28* (2006.01)
(52) U.S. Cl. .................................................. 370/230.1
(58) Field of Classification Search ............... 370/230.1
See application file for complete search history.

(56) References Cited

U.S. PATENT DOCUMENTS

| | | | |
|---|---|---|---|
| 6,775,280 | B1 | 8/2004 | Ma et al. |
| 7,554,914 | B1 | 6/2009 | Li et al. |
| 7,623,455 | B2 | 11/2009 | Hilla et al. |
| 7,739,372 | B2 | 6/2010 | Roese et al. |
| 7,756,029 | B2 | 7/2010 | Licardie et al. |
| 2006/0029097 | A1* | 2/2006 | McGee et al. ............... 370/468 |
| 2006/0098573 | A1* | 5/2006 | Beer et al. .................. 370/230 |
| 2011/0090789 | A1* | 4/2011 | Fung .......................... 370/230 |
| 2012/0026871 | A1* | 2/2012 | Hu et al. ..................... 370/230 |

* cited by examiner

Primary Examiner — Melvin Marcelo

(57) ABSTRACT

A method for configuration of a network device is described herein. Counter information for one or more ports of a plurality of ports of the network device is managed. The one or more ports are aggregated to a logical port in a logical communication channel. The counter information may be determined by the network device. A current load balancing algorithm is determined. The current load balancing algorithm is set for use on network packets on egress out of the logical port. Statistics are determined using the counter information and the current load balancing algorithm. Based on the statistics, the network device is configured with an available load balancing algorithm of a plurality of load balancing algorithms available to the network device.

20 Claims, 6 Drawing Sheets

METHOD FOR CONFIGURATION OF A LOAD BALANCING ALGORITHM IN A NETWORK DEVICE

I. BACKGROUND

Link aggregation or trunking enables the connection of two networked devices, such as network devices, computers, end stations, etc., by grouping multiple physical network links between the devices into a single logical link. For example, administrators of a network aggregate several Ethernet links together into a trunk or a link aggregation group (LAG) as defined in the IEEE 802.3ad standards. By setting up a LAG based on these standards, the network appears to run on a single Media Access Controller (MAC) that distributes and load balances the Ethernet packets among the group of links in the LAG.

A LAG may be used to provide load balancing between two network devices to achieve even distribution of the network load across the member links. One method of load balancing used today is based on Internet Protocol (IP) header source and destination addresses. Other methods may be based on attributes such as MAC source and destination addresses, Layer 4 source and destination port, and/or ingress port and specific hash functions.

In typical networks, the load may not be divided equally among the links of a LAG. Based on the network traffic, certain load balancing algorithms may be better suited than others and an incorrect load balancing algorithm can result in dropped frames on one port and little utilization on another port of the same LAG. The imbalance can cause degradation of application performance for flows going across a LAG link and/or result in some ports being over-utilized and others being under-utilized.

II. BRIEF DESCRIPTION OF THE DRAWINGS

The present disclosure may be better understood and its numerous features and advantages made apparent to those skilled in the art by referencing the accompanying drawings.

III. DETAILED DESCRIPTION OF THE INVENTION

Link aggregation may be used to increase bandwidth for Ethernet connections by aggregating multiple physical ports to form a larger logical port. A physical port is a connection point for a network cable, such as an Ethernet cable, and two networked devices. As used herein, the term Ethernet is interpreted to be read broadly and to encompass local area networks and the protocols and standards used in local area networks.

The logical port has multiple links, referred to herein as redundant links, which are grouped into a single connection such as a link aggregation group (LAG). Link aggregation groups may span from one switch to another, from a network interface card (NIC) to a switch, etc. Aggregation of the multiple links may be implemented in software, hardware, firmware, and the like.

Some load balancing algorithms applied to a LAG provide better performance (e.g., even distribution of network traffic) than others depending on the traffic, which can vary by time of day, day of week, etc.

A method for configuration of a load balancing algorithm in a network device is described herein. Counter information for one or more ports of a plurality of ports of the network device is managed. The one or more ports are aggregated to a logical port in a logical communication channel. The counter information may be determined by the network device. A current load balancing algorithm is determined. The current load balancing algorithm is set for use on network packets on egress out of the logical port. Statistics are determined using the counter information and the current load balancing algorithm. Based on the statistics, the network device is configured with an available load balancing algorithm of a plurality of load balancing algorithms available to the network device.

In another embodiment, a method for configuration of a load balancing algorithm in a network device is described herein. The network device includes a plurality of ports, one or more of which are aggregated to a logical port in a logical communication channel. Performance statistics of a current load balancing algorithm are determined. The current load balancing algorithm is set for use on network packets on egress out of the logical port. It is determined whether calibration is warranted for the logical port. Where calibration is warranted, a calibration process is performed for the logical port. An available load balancing algorithm of one or more available load balancing algorithms associated with the logical port is selected, based on performance of the load balancing algorithm during a calibration phase. The available load balancing algorithm is set for use on network packets on egress out of the logical port.

Figure 1:
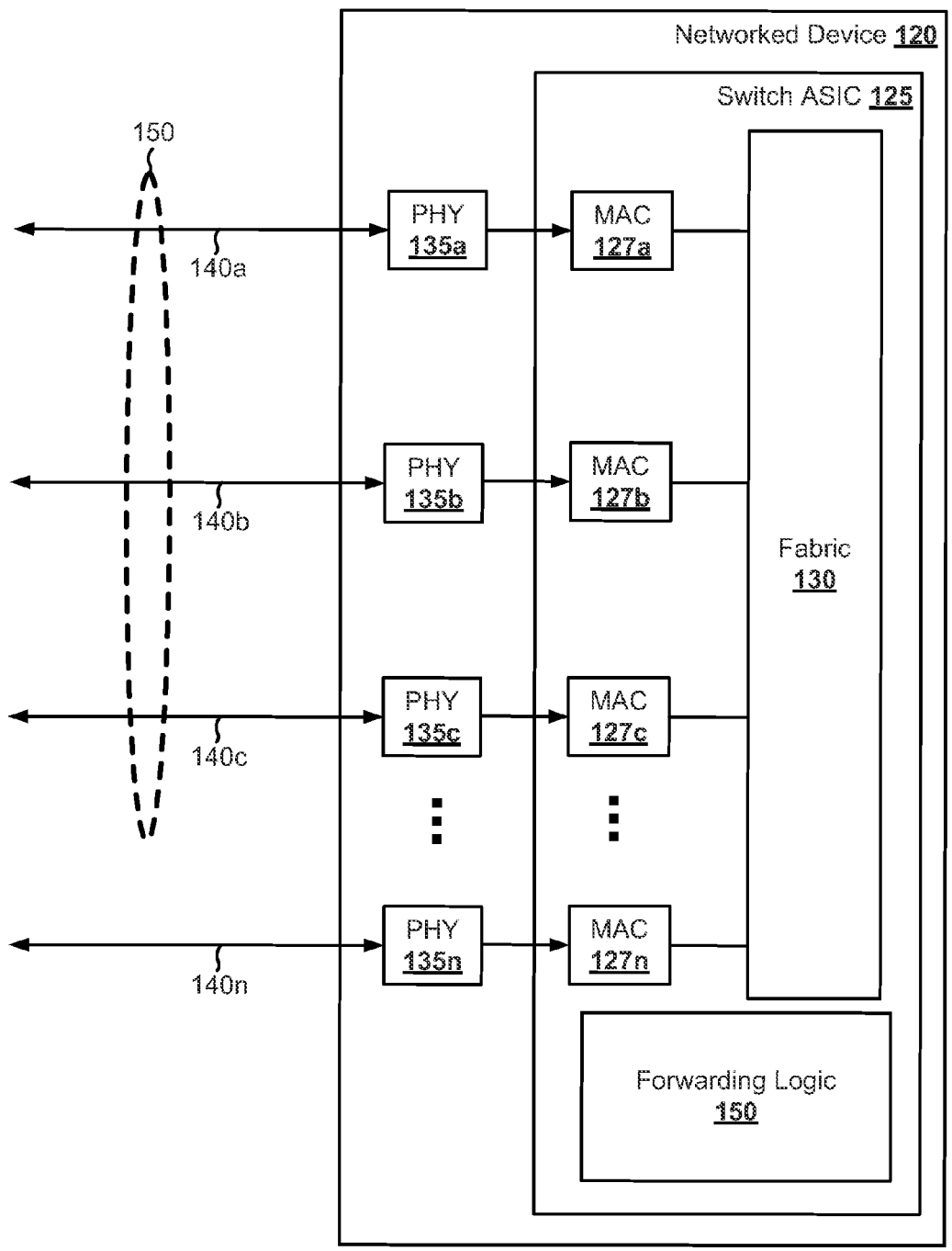
FIG. 1 is topological block diagram of a networked device in accordance with an embodiment of the invention.

FIG. 1 is topological block diagram of a networked device in accordance with an embodiment of the invention. Networked device 120 may be a network device such as a network switch, hub, router, etc. and is configured to process and transfer data packets in a network. Networked device 120 may be operatively coupled to another networked device (not shown) via network cables 140*a*-140*n*.

Networked device 120 includes a switch application-specific integrated circuit (ASIC) 125 and PHYs 135*a*-135*n*. PHY 135*a* is configured to act as the physical interface that communicates with a network cable 140*a*. PHY 135*b* is configured to act as the physical interface that communicates with network cable 140*b*. PHY 135*c* is configured to act as the physical interface that communicates with network cable 140*c*. PHY 135*n* is configured to act as the physical interface that communicates with network cable 140*n*. Switch ASIC 125 includes a fabric 130, such as a switch crossbar, and MACs 127*a*-127*n*. Each of MACs 127*a*-127*n* is configured to translate instructions from the networked device 120.

A subset of the communication links corresponding to network cables 140*a*-140*n* may be aggregated in a single logical communication channel, e.g., LAG or trunk group. For example, the links corresponding to network cables 140*a*-140*c* make up a LAG 150.

In operation, networked device 120 may be configured with one or more trunk load balancing algorithms, which attempt to evenly spread the egress traffic load across all ports that are members of the LAG. At any time, one of the load balancing algorithms is set to operate on each egress frame of LAG 150. Generally, forwarding logic 150 considers certain attributes of the packet on egress and derives the outbound member port for that packet according to the particular load balancing algorithm is set. As used herein, a member port is a physical port that is aggregated into a particular LAG, e.g., one of physical ports of PHY 135a-135c for LAG 150.

Forwarding logic 150 may provide an indication (e.g., statistics) of how a current load balancing algorithm is spreading the network traffic across the member ports. Furthermore, forwarding logic 150 may then change the current load balancing algorithm to another load balancing algorithm that demonstrates better performance given the network conditions.

In general, devices, communication links, protocols, architectures, configurations, and other characteristics can vary from those illustrated herein. For example, other types of switch architectures may also be employed. Further, other configurations of networked device 120 may be used.

The present invention can also be applied in other network topologies and environments. Networked device 120 may be incorporated in a network system, which may be any type of network familiar to those skilled in the art that can support data communications using any of a variety of commercially-available protocols, including without limitation TCP/IP, SNA, IPX, AppleTalk, and the like. Merely by way of example, network system 100 can be a local area network (LAN), such as an Ethernet network, a Token-Ring network and/or the like; a wide-area network; a logical network, including without limitation a logical private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

Figure 2:
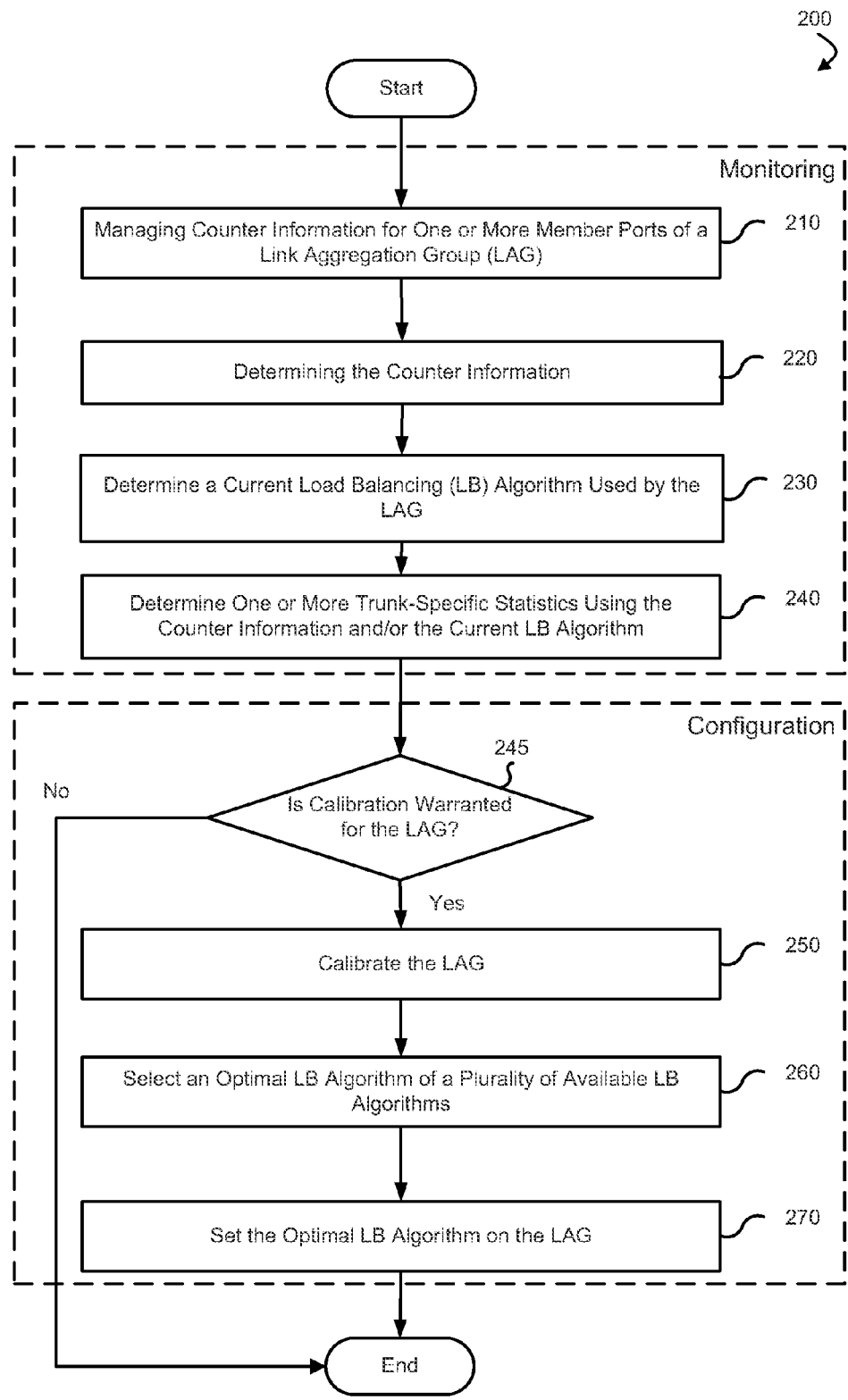
FIG. 2 is a process flow diagram for configuration of a networked device in accordance with an embodiment of the invention.

FIG. 2 is a process flow diagram 200 for configuration of a networked device in accordance with an embodiment of the invention. The depicted process flow 200 may be carried out by execution of one or more sequences of executable instructions. In another embodiment, the process flow 200 is carried out by components of a networked device, an arrangement of hardware logic, e.g., an Application-Specific Integrated Circuit (ASIC), etc. For example, one or more steps of process flow 200 may be performed by forwarding logic of a network device (e.g., switch), a server, end station, or other computer.

Physical ports of a networked device are aggregated in a single logical communication channel and as such are member ports of a LAG. A current load balancing algorithm is set and a monitoring process is performed to track the performance of the LAG using the current load balancing algorithm. As such, an indication is provided as to how well the LAG is performing using the current load balancing algorithm. Furthermore, the networked device may be automatically configured to modify the load balancing algorithm used to best suit the network conditions.

Monitor Performance of Link Aggregation Group

At step 210, counter information for one or more member ports of the link aggregation group are managed. As used herein, counter information may include a count of the number of bytes transmitted (TX) through a member port, a count of the number of bytes received (RX) through a member port, a count of the number of packet drops (e.g., TX drop), and other similar data represented by counters, for a given monitoring interval. Furthermore, counter information is associated with a specific load balancing algorithm applied to a specific LAG, comprising a specific set of ports. Counter information may be tracked using counters, such as Simple Network Management Protocol (SNMP) counters and the like.

The counter information may be collected for the monitoring interval. As used herein, a monitoring interval is a configurable time period for which a count of an attribute of the LAG is tracked. For example, a one minute monitoring interval is used by a bytes RX counter of a member port. As such, the counter tracks the bytes on RX at the port during a one minute window. In another example, a five minute monitoring interval measuring a weighted average of traffic on ingress and egress of each port of the LAG is determined. The count at the end of the interval may be provided for analysis to determine the trunk-specific statistics.

Under certain conditions, the counter information for the LAG may be inaccurate. When these conditions are detected, the counter information is cleared and the counters are restarted. As such, the counter information can be trusted for later use, for example to derive statistics measuring the performance of the LAG. Management of counter information is further described with respect to FIG. 3.

At step 220, the counter information for the LAG is determined, for example by reading the counters associated with each member port. At step 230, the current load balancing algorithm used by the LAG is determined. In one embodiment, the networked device is configured with a plurality of load balancing algorithms, one of which is set for use for packets on egress out of the LAG. The available load balancing algorithms include the remaining unused options as well as the current load balancing option. In another embodiment, the available load balancing algorithms include the remaining unused options and exclude the current load balancing option.

One or more trunk-specific statistics are determined using the counter information and/or the current load balancing algorithm, at step 240. The counter information is analyzed and various statistics about the performance of the LAG are determined. The trunk-specific statistics may include the load balancing algorithm used (i.e., current load balancing algorithm), bytes on TX/RX per member port, drops per member port (e.g., due to over-subscription), percentage of TX traffic per member port, and percentage of RX traffic per member port for the monitoring interval.

In one embodiment, the statistics are accessible using SNMP or show commands on a user interface of the networked device or other user interface of, for example, a central network manager. Accessibility may be also achieved using an automatic reporting function via event-logs, SNMP traps, and the like. As such, network administrators are better equipped to make informed decisions on the best load balancing algorithm that should be used for the LAG.

Configuration

Using the trunk-specific statistics along with other networking parameters, the load balancing algorithm that best suits the network conditions may be determined and set on the LAG.

At step 245, it is determined whether calibration is warranted for the LAG. Even where the current load balancing algorithm results in an uneven distribution of the network load, calibration may not be warranted. If it is determined that calibration is not warranted, processing ends. On the other hand, if calibration is deemed to be warranted, processing continues to step 250. Determining whether calibration is warranted is further described with respect to FIG. 4.

At step 250, calibration is performed. In one embodiment, calibration includes testing the performance of the unused and available load balancing algorithms for a trial period. Counter information for the trial period may be collected for each of the load balancing algorithms that are tested. This counter information for each algorithm may be analyzed and compared against the others. Calibration is further described with respect to FIG. 5.

An optimal best load balancing algorithm of the plurality of available load balancing algorithms is selected, at step 260. The load balancing algorithm that achieved the best performance during the trial period is selected as the optimal load balancing algorithm by using the comparisons of performance data. For example, the load balancing algorithm that achieves the least percentage of traffic load difference across all member ports and with the least number of packet drops is selected as the best option.

At step 270, the optimal load balancing algorithm is set on the LAG. At this point, forwarding decisions will be made using the newly-set load balancing algorithm. As such, the LAG may adapt to changing network conditions and traffic flows.

Figure 3:
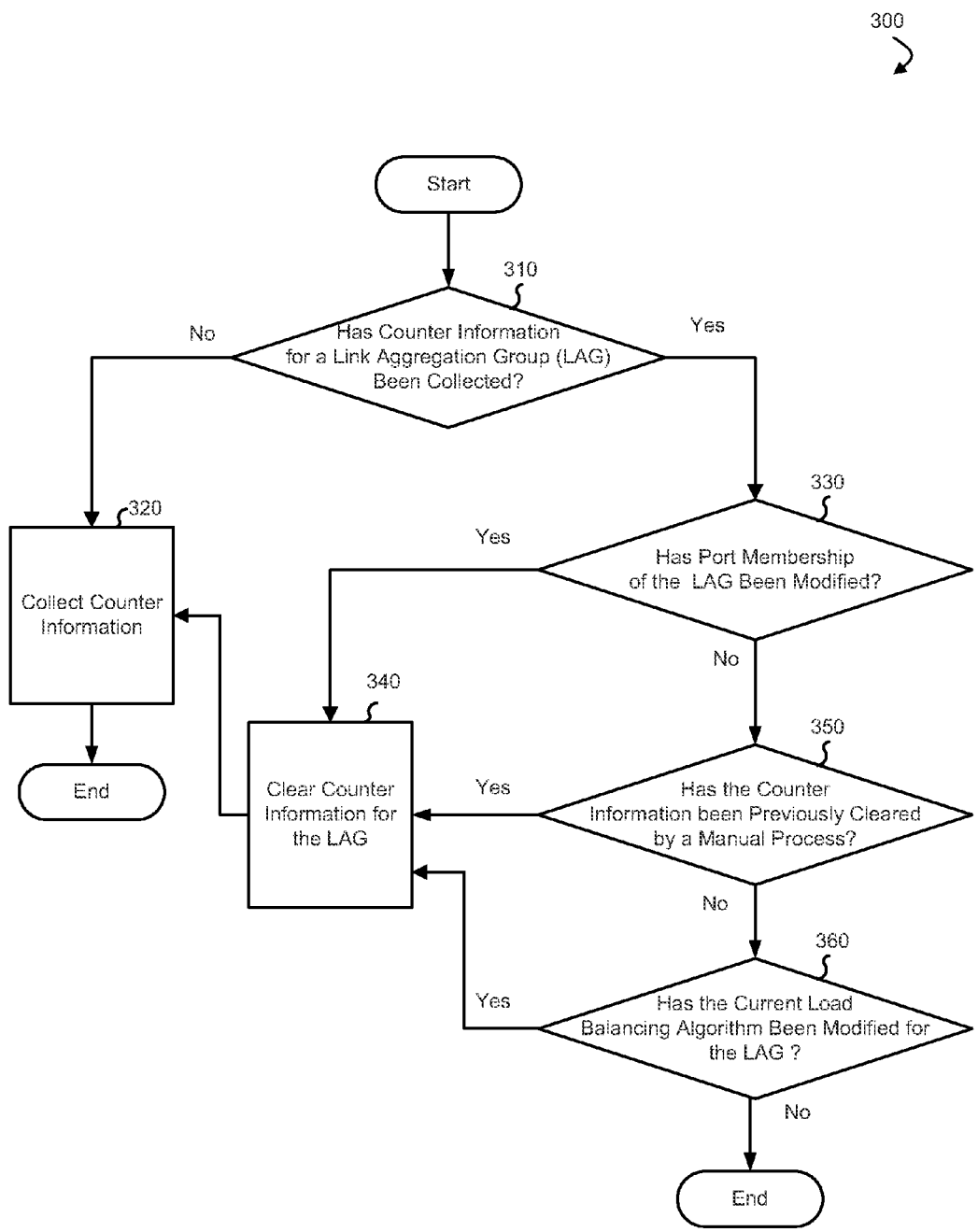
FIG. 3 is a process flow diagram for managing counter information for one or more port members of a link aggregation group in accordance with an embodiment of the invention.

FIG. 3 is a process flow diagram 300 for managing counter information for one or more port members of a link aggregation group in accordance with an embodiment of the invention. The depicted process flow 300 may be carried out by execution of one or more sequences of executable instructions. In another embodiment, the process flow 300 is carried out by components of a networked device, an arrangement of hardware logic, e.g., an Application-Specific Integrated Circuit (ASIC), etc. For example, one or more steps of process flow 300 may be performed by forwarding logic of a network device (e.g., switch), a server, end station, or other computer.

Physical ports of a networked device are aggregated in a single logical communication channel (e.g.; link aggregation group or trunk group). As previously described, counter information is associated with a specific load balancing algorithm applied to a specific LAG, at a start time, and comprising a specific set of ports. Where certain modifications have been made, the counter information is cleared or otherwise managed to maintain accuracy.

At step 310, it is determined whether counter information for a particular LAG has been collected. If not, the counter information is collected at step 320. In one embodiment, the start time associated with the counter information is refreshed with a current time.

At step 330, where the counter information has been collected, it is determined whether port membership of the LAG has been modified, for example at any time after the start time associated with a counter. Modification of the port membership (e.g., adding or removing a member port) affects the accuracy since the count values do not take the modification into account. For example, if a port member is added to the LAG at time $t_5$, a byte TX counter will track the bytes for all port members including the new port member for time $t_5$-$t_n$. The counter is unable to account for the time period $t_0$-$t_5$ for the newly added port member. If the port membership has been modified, processing continues to step 340, where the counter information for the LAG is cleared. Otherwise, processing continues to step 350. Moreover, statistics are cleared for trunks that have been removed.

At step 350, it is determined whether the counter information has been previously cleared by a manual process, for example by a network administrator or other user. The determination is made by using the associated start time. Through an interface, the user may be able to reset the counters. If the counter information has been previously cleared, the counter information for the LAG is cleared at step 340. Otherwise, processing continues to step 360.

At step 360, it is determined whether the current load balancing algorithm has been modified, for example at any time after the start time associated with a counter. Any such modification compromises the validity of the counters. If a modification to the load balancing algorithm is detected, the counter information for the LAG is cleared at step 340. After the counters have been cleared at step 340, processing continues to step 320, where the collection of counter information ensues. If no modifications are detected, processing ends.

Figure 4:
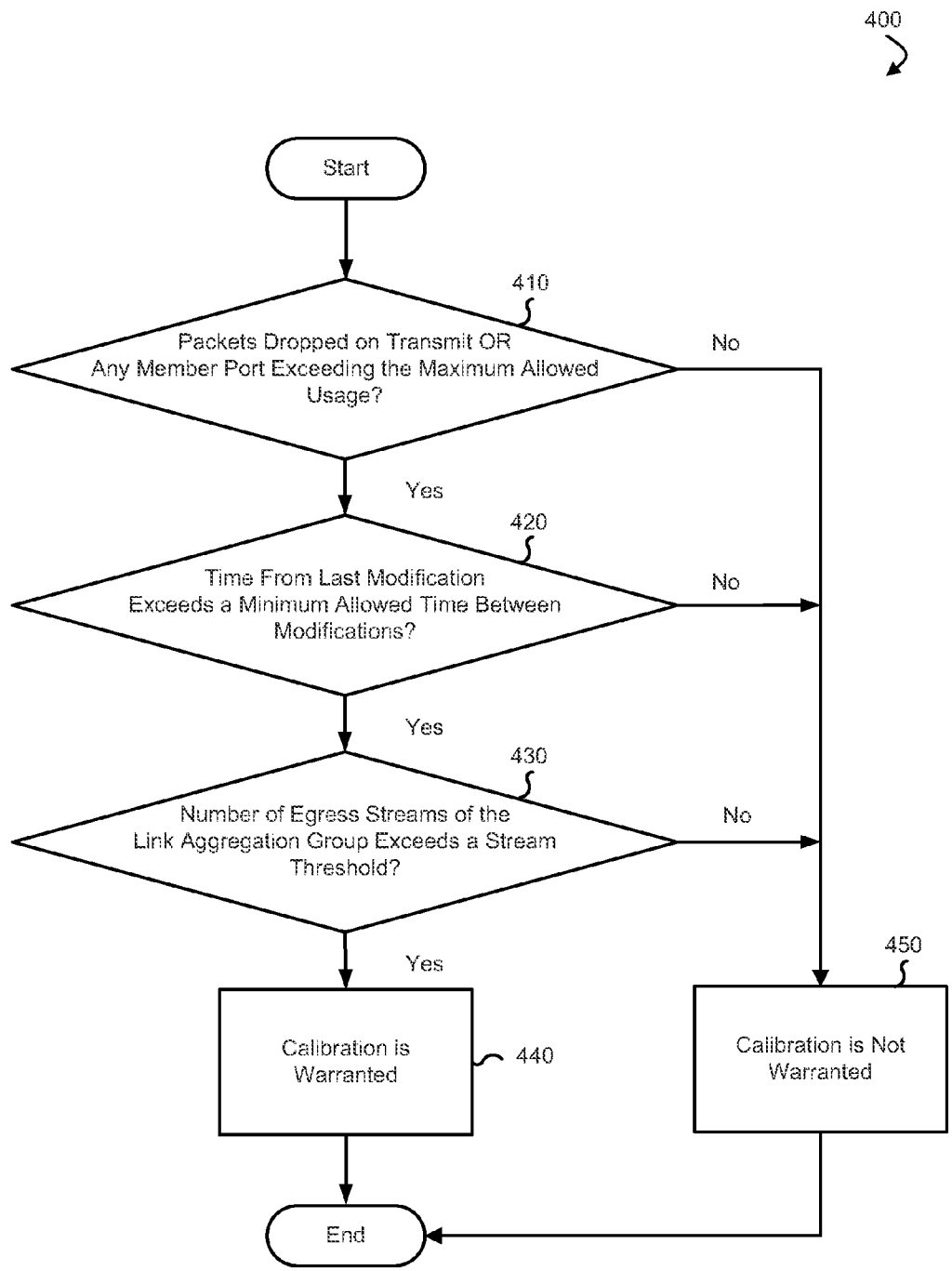
FIG. 4 is a process flow diagram for determining whether calibration is warranted in accordance with an embodiment of the invention.

FIG. 4 is a process flow diagram 400 for determining whether calibration is warranted in accordance with an embodiment of the invention. The depicted process flow 400 may be carried out by execution of one or more sequences of executable instructions. In another embodiment, the process flow 400 is carried out by components of a networked device, an arrangement of hardware logic, e.g., an Application-Specific Integrated Circuit (ASIC), etc. For example, one or more steps of process flow 400 may be performed by forwarding logic of a network device (e.g., switch), a server, end station, or other computer.

As previously mentioned, calibration may not be warranted in all situations where the current load balancing algorithm results in an uneven distribution of the network load. In one embodiment, the statistics for the LAG are analyzed for a less-than-optimal spread of traffic load and dropped packets.

At step 410, it is determined whether packets have been dropped on transmit at any member port. Moreover, it is also determined whether any of the member ports exceed a maximum allowed usage (i.e., maximum utilization threshold), which may indicate that traffic load is not being spread evenly. If neither condition is detected, processing continues to step 450, where it is determined that calibration is not warranted. If either condition is detected, processing continues to step 420.

At step 420, it is determined whether the time from a last modification of the current load balancing algorithm exceeds a minimum allowed time between such modifications. The minimum allowed time between changes to the load balancing algorithm used can lessen or prevent repeated changes to the forwarding decision-making. If the time does not exceed the minimum allowed time, processing continues to step 450. If the minimum allowed time is exceeded, processing continues to step 430.

It is well understood that network streams, such as streaming media, are bandwidth-intensive. Any load balancing algorithm used by a system may allocate all packets of a stream to the same egress port, at least for the purpose of maintaining order of the packets. Where there is a large number of streams that are being handled by the LAG, the performance of the LAG may be improved by calibration and subsequent use of a load balancing algorithm that is best suited for this type of traffic.

It is determined whether the number of streams on egress out of a port of the link aggregation group (LAG) exceeds a stream threshold, at step 430. The stream threshold represents a sufficiently high number of identified streams that is at least more than the number of member ports of the LAG. In one embodiment, the stream threshold is double the number of member ports.

To make this determination, the streams which are directed to the LAG are analyzed. In particular, a source address field in a packet from a stream is examined. Destination information of the packet is used to determine whether the stream is egressing out of a port of the LAG. In other words, if the destination resides on the trunk, the stream is identified.

Where the number of identified streams exceeds the stream threshold, processing continues to step 440, where it is determined that calibration is warranted. Otherwise, processing continues to step 450.

Figure 5:
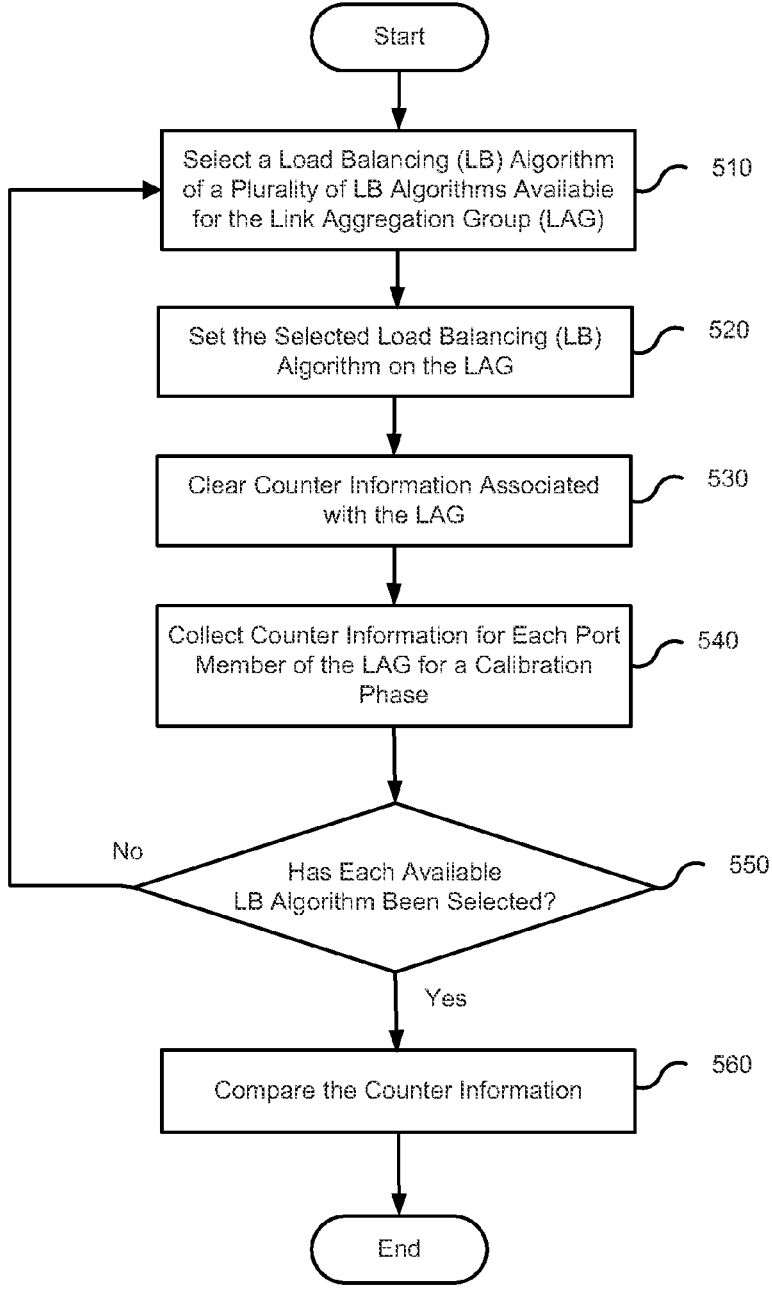
FIG. 5 is a process flow diagram for calibrating one or more load balancing algorithms in accordance with an embodiment of the invention.

FIG. 5 is a process flow diagram for calibrating one or more load balancing algorithms in accordance with an embodiment of the invention. The depicted process flow 500 may be carried out by execution of one or more sequences of executable instructions. In another embodiment, the process flow 500 is carried out by components of a networked device, an arrangement of hardware logic, e.g., an Application-Specific Integrated Circuit (ASIC), etc. For example, one or more steps of process flow 500 may be performed by forwarding logic of a network device (e.g., switch), a server, end station, or other computer.

Calibration may include testing the performance of the unused and available load balancing algorithms for a trial period. More specifically, each of the available load balancing algorithms, except for the load balancing algorithm that is in current use, is tried and performance is recorded for a fixed time interval (hereinafter, "calibration phase"). After calibration, the load balancing algorithm that achieved the optimal load balancing across the member ports of the LAG is selected for use.

At step 510, a load balancing algorithm of a plurality of load balancing algorithms available for the link aggregation group (LAG) is selected, for example, for testing during a calibration phase. In one embodiment, an order for testing the load balancing algorithms is established. The algorithms may be selected according to their priority, where the algorithms with higher priority are more likely to achieve optimal load balancing objectives. For example, since many Ethernet networks carry IP packets, the following priority (from highest to lowest) may be implemented: IP SA/DA (source/destination), MAC SNDA, IP SA, IP DA, MAC SA, and others.

The algorithms may be weighted based on various parameters regarding the LAG. In one embodiment, the parameters may include: the number of member ports of the LAG, whether the LAG is an uplink, whether the network device is a switch used as an aggregator or an edge device, whether the switch is used for routing, etc. More specifically, if the LAG is an uplink and the network device is an edge device, the IP DA algorithm is not preferable and may be placed at the lowest priority. If the networked device is a Layer 2 switch and is an aggregator or edge device, the MAC SA DA algorithm is favored. If the switch is used for routing, the MAC SA algorithm is not favored.

The selected load balancing algorithm is set on the LAG, at step 520. In other words, the selected load balancing algorithm is used as the current load balancing algorithm, to actively forward network traffic on the LAG. At step 530, counter information associated with the LAG are cleared. As previously described, counters may be cleared where there is a change in the load balancing algorithm used.

At step 540, counter information for each port member of the LAG is collected for the calibration phase. In one embodiment, calibration for the selected load balancing algorithm is halted as soon as packet drops are experienced. Under such circumstances, processing may continue to step 550 before the expiration of the calibration phase. In another embodiment, calibration may be also halted if the traffic load on the LAG exceeds a capacity threshold, such as 80%, even if there is a reasonable load spread and no packet drops have occurred.

At step 550, it is determined whether each available load balancing algorithm has been selected (i.e., tested for the calibration phase). If not, processing continues back to step 510, where another of the available load balancing algorithms is selected.

Otherwise, processing continues to step 560, where the counter information for each of the tested load balancing algorithms are compared against the others. In one embodiment, the load balancing algorithms are ranked based on the comparison performed. For example, ranking may be performed based on various factors, such as percentage of traffic load difference across all member ports, number of packet drops, etc.

Figure 6:
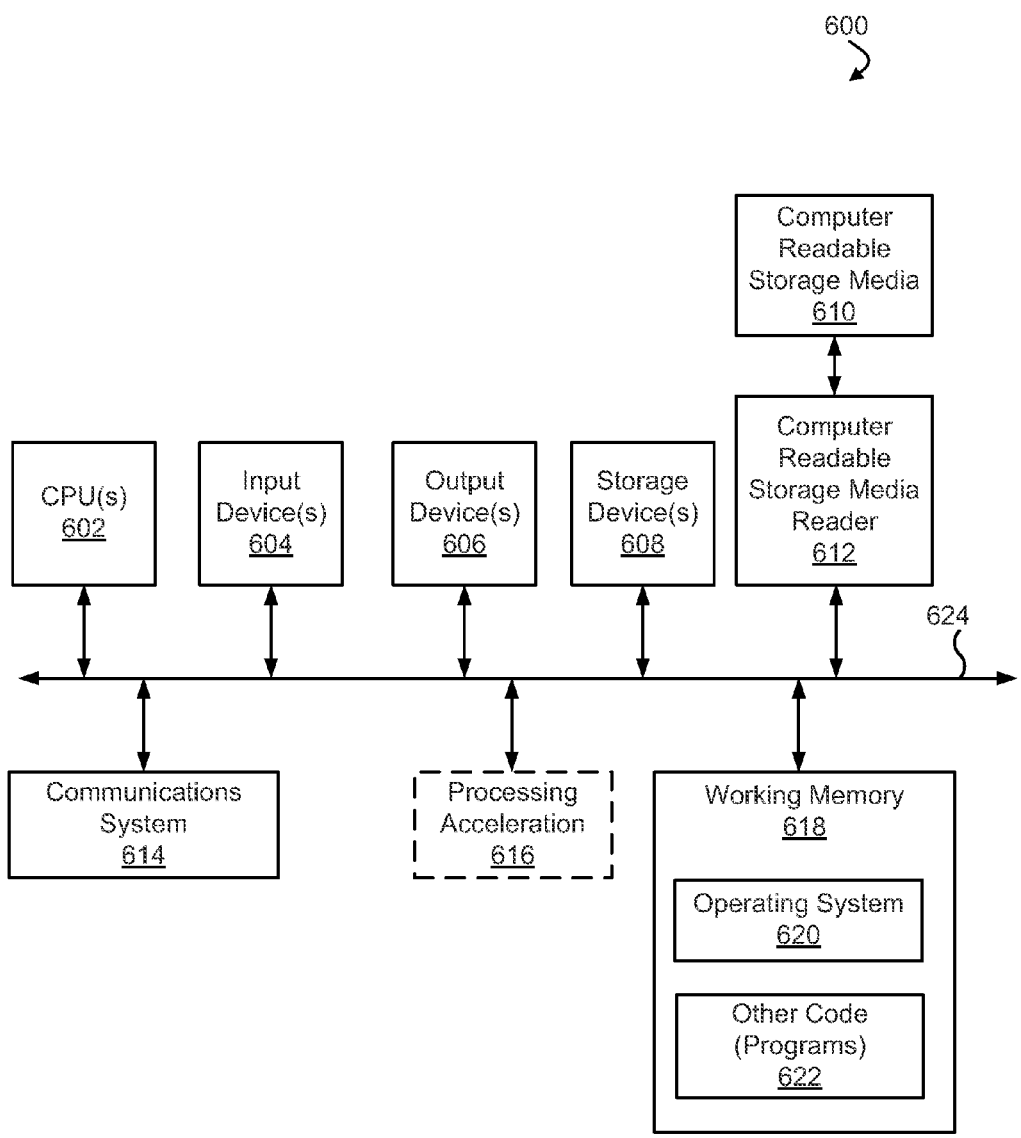
FIG. 6 illustrates an exemplary computer system in which various embodiments of the present invention may be implemented.

FIG. 6 illustrates an exemplary computer system 600 in which various embodiments of the present invention may be implemented. The system 600 may be used to implement any of the computer systems described above. The computer system 600 is shown comprising hardware elements that may be electrically coupled via a bus 624. The hardware elements may include one or more central processing units (CPUs) 602, one or more input devices 604 (e.g., a mouse, a keyboard, etc.), and one or more output devices 606 (e.g., a display device, a printer, etc.). The computer system 600 may also include one or more storage devices 608. By way of example, the storage device(s) 608 can include devices such as disk drives, optical storage devices, solid-state storage device such as a random access memory ("RAM") and/or a read-only memory ("ROM"), which can be programmable, flash-updateable and/or the like.

The computer system 600 may additionally include a computer-readable storage media reader 612, a communications system 614 (e.g., a modem, a network card (wireless or wired), an infra-red communication device, etc.), and working memory 618, which may include RAM and ROM devices as described above. In some embodiments, the computer system 600 may also include a processing acceleration unit 616, which can include a digital signal processor DSP, a special-purpose processor, and/or the like.

The computer-readable storage media reader 612 can further be connected to a computer-readable storage medium 610, together (and in combination with storage device(s) 608 in one embodiment) comprehensively representing remote, local, fixed, and/or removable storage devices plus storage media for temporarily and/or more permanently containing, storing, transmitting, and retrieving computer-readable information. The communications system 614 may permit data to be exchanged with the network and/or any other computer described above with respect to the system 600.

The computer system 600 may also comprise software elements, shown as being currently located within a working memory 618, including an operating system 620 and/or other code 622, such as an application program (which may be a client application, Web browser, mid-tier application, RDBMS, etc.). It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for storing a plurality of instructions, or portions of instructions, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

What is claimed is:

1. A method for configuration of a network device, the method comprising:
    managing counter information for one or more ports of a plurality of ports of the network device, the one or more ports aggregated to a logical port in a logical communication channel;
    determining, by the network device, the counter information;
    determining a current load balancing algorithm, the current load balancing algorithm set for use on network packets on egress out of the logical port;
    determining statistics using the counter information and the current load balancing algorithm; and
    configuring the network device with an available load balancing algorithm of a plurality of load balancing algorithms available to the network device, based on the statistics.

2. The method of claim 1, wherein determining the counter information comprises collecting the counter information for a monitoring interval.

3. The method of claim 2, wherein managing the counter information comprises clearing the counter information where port membership of the logical port is modified during the monitoring interval.

4. The method of claim 2, wherein managing the counter information comprises clearing the counter information where the counter information is cleared during the monitoring interval.

5. The method of claim 2, wherein managing the counter information comprises clearing the counter information where the current load balancing algorithm is modified during the monitoring interval.

6. The method of claim 1, wherein configuring the network device comprises:
    determining whether calibration is warranted for the logical port;
    calibrating the logical port;
    selecting the available load balancing algorithm based on performance of the available load balancing algorithm during a calibration phase; and
    setting the available load balancing algorithm for use on network packets on egress out of the logical port.

7. The method of claim 6, wherein determining whether calibration is warranted comprises detecting a dropped network packet on transmit on the logical port.

8. The method of claim 6, wherein determining whether calibration is warranted comprises detecting utilization of a port of the one or more ports exceeding a maximum utilization threshold.

9. The method of claim 6, further comprising determining calibration is warranted, and wherein calibrating the logical port comprises: for each of the plurality of available load balancing algorithms, collecting counter information for each of the one or more ports for the calibration phase using an available load balancing algorithm.

10. The method of claim 9, further comprising comparing the counter information for the calibration phase for each of the plurality of available load balancing algorithms.

11. The method of claim 6, wherein selection is based on traffic load difference across the one or more ports of the logical port.

12. A method for configuration of a network device including a plurality of ports, one or more ports of the plurality of ports aggregated to a logical port in a logical communication channel, the method comprising:
    determining performance statistics of a current load balancing algorithm, by the network device, wherein the current load balancing algorithm is set for use on network packets on egress out of the logical port;
    determining whether calibration is warranted for the logical port;
    calibrating the logical port;
    selecting an available load balancing algorithm of one or more available load balancing algorithms associated with the logical port based on performance of the available load balancing algorithm during a calibration phase;
    setting the available load balancing algorithm for use on network packets on egress out of the logical port.

13. The method of claim 12, wherein calibrating comprises:
    for each of the one or more available load balancing algorithms,
        selecting an available load balancing algorithm;
        setting the available load balancing algorithm on the logical port; and
        collecting counter information associated with the available load balancing algorithm; and
    comparing the counter information associated with each of the one or more available load balancing algorithms.

14. The network device of claim 13, wherein comparing comprises:
    analyzing the counter information associated with each of the one or more available load balancing algorithms; and
    ranking each of the one or more available load balancing algorithms based on the analysis.

15. The network device of claim 14, wherein the one or more available load balancing algorithms are weighted based on a parameter about the logical port.

16. A non-transitory computer-readable storage medium storing a plurality of instructions for controlling a data processor to configure a network device, the plurality of instructions comprising:
   instructions that cause the data processor to manage counter information for one or more ports of a plurality of ports of the network device, the one or more ports aggregated to a logical port in a logical communication channel;
   instructions that cause the data processor to determine the counter information;
   instructions that cause the data processor to determine a current load balancing algorithm, the current load balancing algorithm set for use on network packets on egress out of the logical port;
   instructions that cause the data processor to determine statistics using the counter information and the current load balancing algorithm; and
   instructions that cause the data processor to configure the network device with an available load balancing algorithm of a plurality of load balancing algorithms available to the network device, based on the statistics.

17. The non-transitory computer-readable storage medium of claim 16 wherein the instructions that cause the data processor to determine the counter information comprise: instructions that cause the data processor to collect the counter information for a monitoring interval.

18. The non-transitory computer-readable storage medium of claim 16 wherein the instructions that cause the data processor to configure the network device comprise:
   instructions that cause the data processor to determine whether calibration is warranted for the logical port;
   instructions that cause the data processor to calibrate the logical port;
   instructions that cause the data processor to select the available load balancing algorithm based on performance of the available load balancing algorithm during a calibration phase; and
   instructions that cause the data processor to set the available load balancing algorithm for use on network packets on egress out of the logical port.

19. The non-transitory computer-readable storage medium of claim 18 wherein the instructions that cause the data processor to determine whether calibration is warranted comprise instructions that cause the data processor to detect a dropped network packet on transmit on the logical port.

20. The non-transitory computer-readable storage medium of claim 18 wherein the instructions that cause the data processor to determine whether calibration is warranted comprise instructions that cause the data processor to detect utilization of a port of the one or more ports exceeding a maximum utilization threshold.

* * * * *